United States Patent [19]

Monahan

[11] 4,233,127
[45] Nov. 11, 1980

[54] PROCESS AND APPARATUS FOR GENERATING HYDROGEN AND OXYGEN USING SOLAR ENERGY

[76] Inventor: Daniel E. Monahan, 4925 Central Ave., Charlotte, N.C. 28205

[21] Appl. No.: 948,061

[22] Filed: Oct. 2, 1978

[51] Int. Cl.³ .......................... B01J 19/08; B01J 19/26
[52] U.S. Cl. ............................. 204/157.1 R; 250/527; 422/186; 423/579; 423/648 R
[58] Field of Search ................. 423/648 R, 579; 204/157.1 R; 250/527; 422/186

[56] References Cited

U.S. PATENT DOCUMENTS

| 4,042,334 | 8/1977 | Matovich . | |
|---|---|---|---|
| 4,053,576 | 10/1977 | Fletcher | 423/579 |
| 4,071,608 | 1/1978 | Diggs | 423/579 |

*Primary Examiner*—Howard S. Williams
*Attorney, Agent, or Firm*—Ralph H. Dougherty

[57] ABSTRACT

This application relates to a method and apparatus for generating hydrogen and oxygen gas from water with solar energy. A solar reflector concentrates solar energy into a water-containing reaction chamber to raise the temperature to the dissociation temperature of water. Both the thermal and photolytic effects of the sun's rays are employed to dissociate water. The hydrogen and oxygen formed upon dissociation are drawn off and separated.

38 Claims, 25 Drawing Figures

PROCESS AND APPARATUS FOR GENERATING HYDROGEN AND OXYGEN USING SOLAR ENERGY

BACKGROUND OF THE INVENTION

This invention relates to the generation of hydrogen and oxygen from water using solar energy. According to the present invention, solar energy is converted into potential energy in the form of hydrogen and oxygen which may be in liquid or gaseous state, or as solid compound such as a metallic hydride. The uses of liquid oxygen are well known. Since demands on conventional non-replaceable fossil fuels have increased drastically over the recent decade, threatening the world supply of these natural resources and the cost of generation of electric and nuclear power have both increased drastically, it has become clear that a new fuel is needed. Hydrogen is readily available in water and fills this need. There are presently available engines and heating and power plants which can run on hydrogen.

In prior art devices such as that taught in U.S. Pat. No. 4,030,890, solar energy (sunlight) is converted into thermal energy (heat) through mechanical means and with attendant energy losses. This thermal energy is then transferred, with additional energy losses, through metallic interfaces to the reactant (water) until sufficient thermal energy has been transferred to the water to bring about its thermal decomposition. Such devices have several major disadvantages. They rely solely on thermal energy to promote dissociation. Thus, they do not take advantage of the ability of certain frequencies of the light spectrum, primarily the near ultraviolet wave ranges to fracture the molecular bonds in the molecules of water vapor, causing direct dissociation through the medium of wave form irradiation. This phenomenon is known as photolysis, or the photolytic effect of the ultraviolet radiation in sunlight upon the molecular bonds in water vapor molecules. When combined with the known effects of high thermal energy levels upon water vapor molecules to cause direct thermal decomposition of the water into elemental and molecular hydrogen and oxygen, the photolytic effect permits a given rate of decomposition to take place at lower temperatures, and with greater efficiency of energy utilization than if thermal energy alone is employed. The combined effects of high thermal energy and photolytic effect of ultraviolet radiation allow dissociation of water vapor to take place at a greater rate than if thermal energy alone is employed.

The mechanism through which this combined reaction takes place is believed to be as follows:

First, a portion of the concentrated incoming radiant energy (sunlight) primarily the infra-red frequencies (wave-lengths of approximately $10^4$ to $10^6$ angstroms) is converted to thermal energy (heat) upon contact with water vapor. This thermal energy is then absorbed by the molecules of the water vapor, agitating (heating) the water molecules and gradually increasing the frequency level of molecular vibrations to the level required for rupture of the molecular bonds and dissociation of the water molecules into their components. It is known that the level of thermal energy required for this molecular dissociation is extremely high, in excess of 3000° K. at standard pressure.

Second, radiant wave form energy in the form of concentrated sunlight directly bombards the agitated molecular bonds of the water vapor molecules and the near ultra-violet wave lengths (approximately $10^2$ to $10^3$ angstroms) of the light spectrum directly excite the vibrational level of the molecular bonds beyond the level required for fracturing of the molecular bonds resulting in the dissociation of the water molecules into atoms molecules and ions of hydrogen (H+, $H_2$) and oxygen (O, $O_2$), and hydroxyl radicals (OH). Thus, the near ultra-violet wave frequencies of the natural light spectrum can supply additional energy for breaking the molecular bonds in water vapor. Therefore, concentrated ultra violet energy in combination with high levels of thermal energy can allow a given rate of direct dissociation of the molecules of water vapor to take place at lower thermal energy levels and with greater energy utilization efficiencies than if thermal energy alone is employed. Conversely, at a given level of thermal energy, dissociation of water vapor molecules will proceed at a greater rate.

The present invention takes full advantage of both the thermal and photolytic properties of solar energy (sunlight).

Thus, this invention has significant advantages over other solar energy devices.

Direct dissociation of water molecules in my invention can take place at lower thermal energy levels and with greater energy utilization, thus smaller scale collection apparatus can be employed with equivalent results, with an attendant lower capital investment.

Since prior art devices transmit thermal energy to the water indirectly through the wall of a metallic container, there are substantial energy losses due to the conduction transfer through the container.

The concentrated solar energy initially impacts the container wall of previously known devices directly at the extremely high temperature levels required to (a) overcome energy transfer losses and (b) sustain the extremely high internal temperatures required for direct thermal dissociation. This requires that the container be constructed of materials capable of withstanding these extremely high temperature concentrations and the rapid upward and downward temperature excursions caused by abrupt fluctuations in the level of available sunlight over extended periods without undergoing catastrophic failure e.g. by fusion, thermal shock, fracture, corrosion, embrittlement, etc. Suitable materials such as tungsten not only are very expensive, but also are very difficult to machine and manufacture.

The method of the present invention causes the concentrated solar energy to interact directly with the water vapor in the reaction chamber, avoiding direct contact of the concentrated light beam with any portion of the reaction chamber structure. Therefore, less expensive materials can be used to contain the reaction.

OBJECTS OF THE INVENTION

Accordingly, it is the principal object of this invention to provide a means for obtaining hydrogen at low cost using solar energy.

It is another object to provide a means for obtaining elemental oxygen as a byproduct from the process.

It is a further object to provide a method and apparatus for generating hydrogen and oxygen using solar energy.

It is also an object to reduce the likelihood of failure of materials of construction due to heat.

SUMMARY OF THE INVENTION

This invention utilizes solar energy by concentrating solar rays into a water-containing reaction chamber, raising the temperature within the reaction chamber to at least as high as the dissociation temperature of water, dissociating the water by a combination of thermal energy and photolysis, withdrawing the dissociated gases, hydrogen and oxygen, into a gas separating means, separating the two gases, and processing them for later use. Alternatively, separation may be achieved in the reaction chamber.

BRIEF DESCRIPTION OF THE DRAWINGS

This invention is better understood by referrng to the following detailed specification and the appended drawings in which.

DETAILED DESCRIPTION

Figure 1:
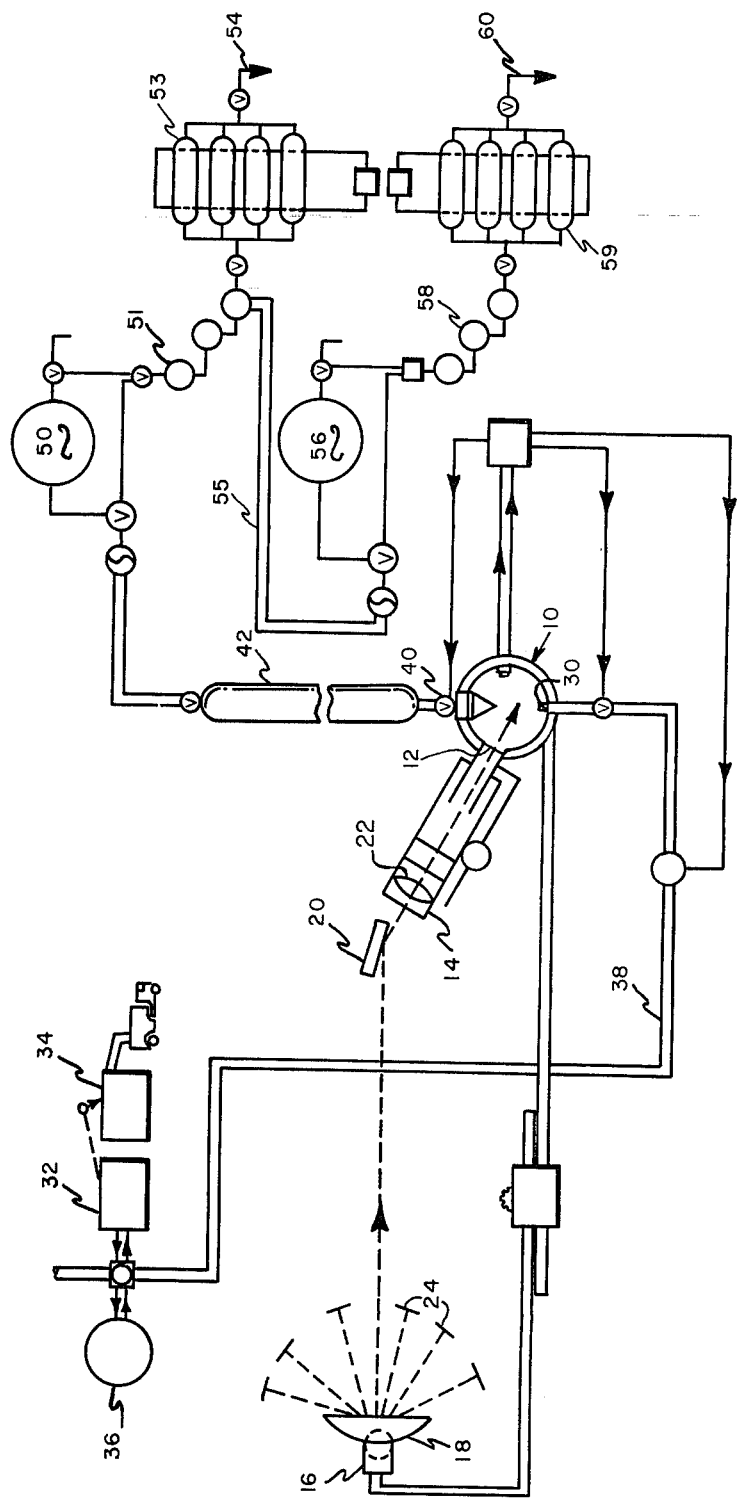
FIG. 1 illustrates schematically one embodiment of this invention.

Referring now to FIG. 1, a reaction chamber 10 is a sealed vessel lined with high temperature ceramic and/or reflective material. Mounted in the wall of the reaction chamber is a transparent focusing lens 12 which also acts as a vapor barrier. A movable focusing lens tube 14 external to the chamber is directed toward the lens 12. An automatic tracking drive mechanism 16 is connected to a 2-axis 360° tracking parabolic reflector 18, which collects the sun's rays and reflects them against an optional mirror 20, which directs the rays through optional collector lens 22 and focusing lens 12. Secondary reflector such as heliostats 24 may be employed to direct the sun's rays into reflector 18 and increase the intensity of the rays of solar energy collected. Water is injected into the bottom of reaction chamber 10 through an injector head 30. The water is preferably demineralized by ion exchange in a standard demineralizing apparatus 32, and the minerals are recovered at 34 as an additional byproduct of this process. Cleaned, demineralized (chlorine-free) water is stored in holding tanks 36 until pumped through line 38 to the water injector head 30. The temperature in the reaction vessel 10 is raised to at least 4500° F. by directing concentrated solar energy therein. The optimum dissociation temperature of water is in the range of 5000° to 7500° F. However, the dissociation reaction begins at a temperature of about 4500° F.

The dissociated hydrogen and oxygen and other byproducts in the gaseous state are released from the reaction chamber through a servo pressure valve 40 into a gas collecting tank 42 which is associated with a gas separating means such as a separator tank or a permeable membrane separating unit. The mixed dissociated gases may be separated by one of several techniques such as compression or refrigeration in series connected compressors or refrigeration units 51 and the resulting liquid oxygen is stored in tanks 53 such as Dewar flasks, the low temperature of which is maintained by a compression-liquefaction and repressurization system.

The remaining unseparated gas is circulated through line 55 from where it may be stored in tank 56 for future use, or it may be refrigerated and compressed in units 58 to liquid hydrogen and stored in tanks 59 such as Dewar flasks from which liquid hydrogen may later be withdrawn at 60.

A preferred method of separating hydrogen from the reaction products is by diffusion through a hydrogen permeable membrane or molecular sieve such as silver-palladium, or a finely woven mesh membrane of iridium, thoria, or other heat-resistant refractory oxide.

Figure 3:
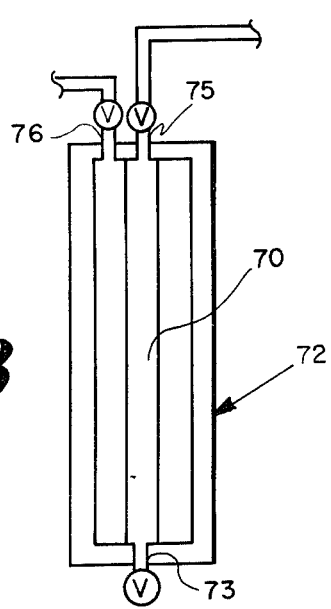
FIG. 3 is a cross-section of an alternative gas separation tank.
Figure 2:
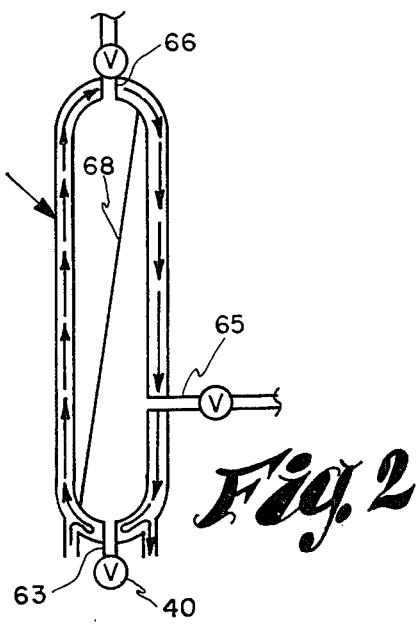
FIG. 2 is a cross-section of a gas separation tank having a specific gas permeable membrane separation means.

FIG. 2 shows a permeable membrane apparatus for separating the reaction products. Tank 62, which would be positioned in FIG. 1 in the location of tank 42, has an inlet pipe 63 leading from valve 40, an oxygen outlet pipe 65 and a hydrogen outlet pipe 66. A hydrogen permeable membrane 68 separates the tank into two compartments. The membrane 68 can be angled as shown in FIG. 2 or can be inserted at any other desired angle, including horizontal. Alternatively, the hydrogen permeable membrane can be in the form of a tube 70 as shown in FIG. 3. In this case, tank 72 has an inlet 73 an oxygen outlet 75 and a hydrogen outlet 76. The tanks 62 or 72 should be water jacketed as shown. Note that the hydrogen is the only product that will pass through the membrane, thus other impurities such as water vapor will be taken off with the oxygen.

Another suitable separation method is the gravity-density technique by which the differential in atomic weights or densities of hydrogen and oxygen is utilized to move the elements away from each other by the force of gravity in a vertical tank, resulting in oxygen being drawn off at the bottom and hydrogen being drawn off at the top. A third separation technique is compression-liquefaction, in which a mixture of the dissociated gases is compressed. Gases are then passed through a porous plug or Joule-Thomson valve and the constituent gases are separated in a reverse distillation process as cryogenic liquids. Other alternatives separation techniques that may be employed include; diffusion through an oxygen-permeable membrane, magnetic separation, ionic charge separation through mass spectroscopy, hydrogen absorption, oxygen absorption, and solubility separation.

Figure 4:
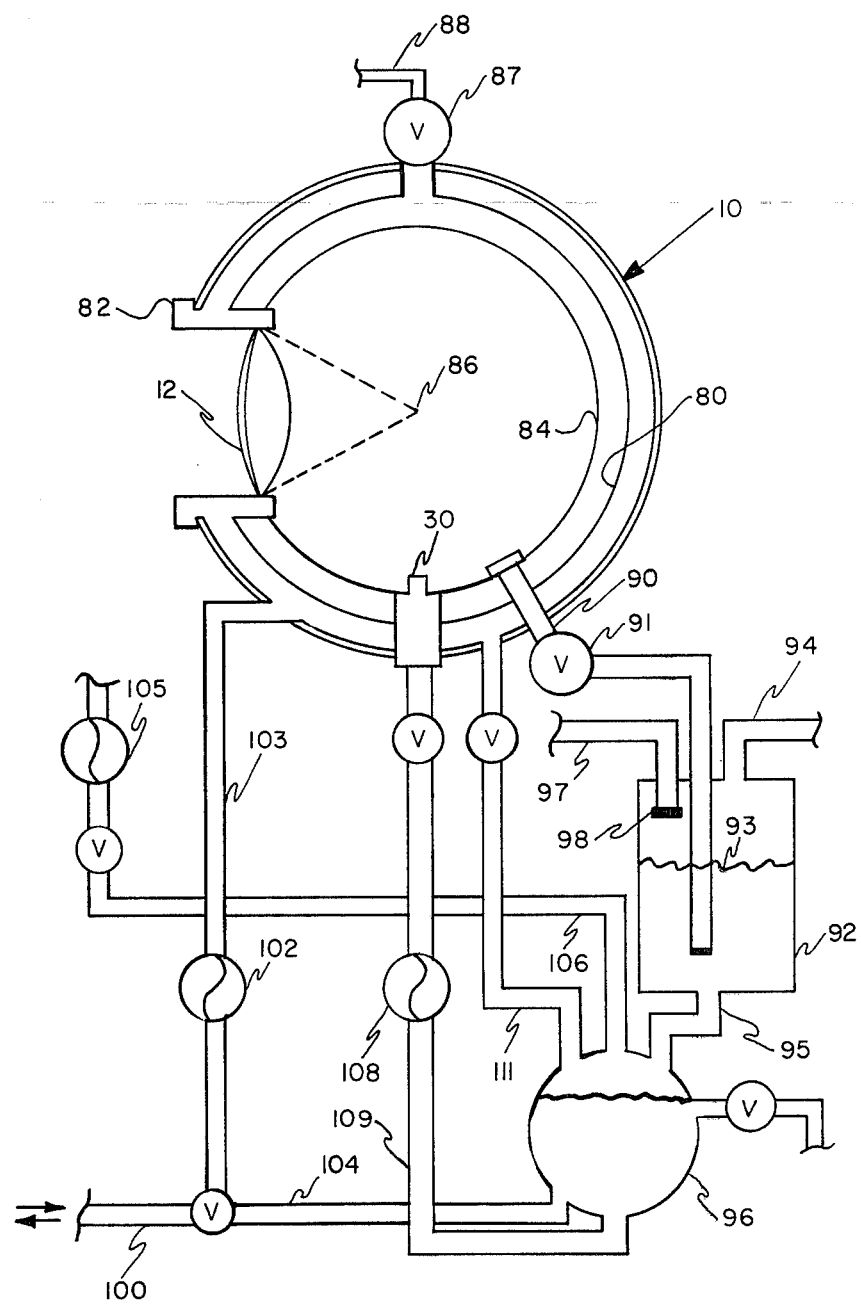
FIG. 4 illustrates schematically a reactor vessel including an internal oxygen-hydrogen separation system and associated process water piping.

The separation of hydrogen and oxygen should take place as close to the reaction zone as possible. After the gases have left the reaction zone, the temperature begins to drop and recombination takes place rapidly. FIG. 4 shows a reaction chamber configuration and associated apparatus for achieving hydrogen and oxygen separation within the reaction chamber itself. This allows the separation of hydrogen and oxygen to take place at the highest possible temperature which results in greater yields and higher efficiencies than when separation is carried out at lower temperatures and at more remote locations.

In FIG. 4, reactor 10 has a water cooled jacket 80 and carries lens 12 in a water-cooled lens sleeve 82. A hydrogen-permeable membrane 84 which has the same general configuration as reactor 10 is situated within the reactor. A variable spray injector head 30 provides the water source for the reactor. Lens 12 focuses at a point 86 within the reactor above the spray head. Concentration of solar rays at point 86 dissociates water into elemental hydrogen, oxygen and other products as mentioned before. Hydrogen, which passes through the membrane 84, is removed from the reactor through valve 87 and hydrogen takeoff line 88. Oxygen is removed along with other impurities such as water vapor from the inner chamber of the reactor through oxygen takeoff line 90 and valve 91 to a water containing gas separator tank 92. The oxygen and other impurities enter tank 92 beneath the water level 93, are bubbled through the water which will condense the water vapor to liquid. Oxygen is then removed through takeoff line 94. Separator tank water is removed from the separator tank 92 through a water line 95 to a preheater mixing tank 96. Makeup cooling water is introduced to gas separator tank 92 through waterline 97. Optionally, the makeup water may be injected through a spray head 98.

Cooling water for water jacket 80 and lens sleeve 82 is provided from pipe 100 and pumped through pump 102 and pipe 103 into jacket 80. Between operating periods cooling water may be recirculated from tank 96 through pipe 104. The main process water supply is provided through pump 105 and line 106 to mixing tank 96 wherein it is preheated. Pump 108 withdraws the preheated water from tank 96 through line 109 and forces it through injector head 30 into reactor 10. Cooling water return line 111 returns cooling water from the cooling water jacket 80 to mixing tank 96.

Figure 5:
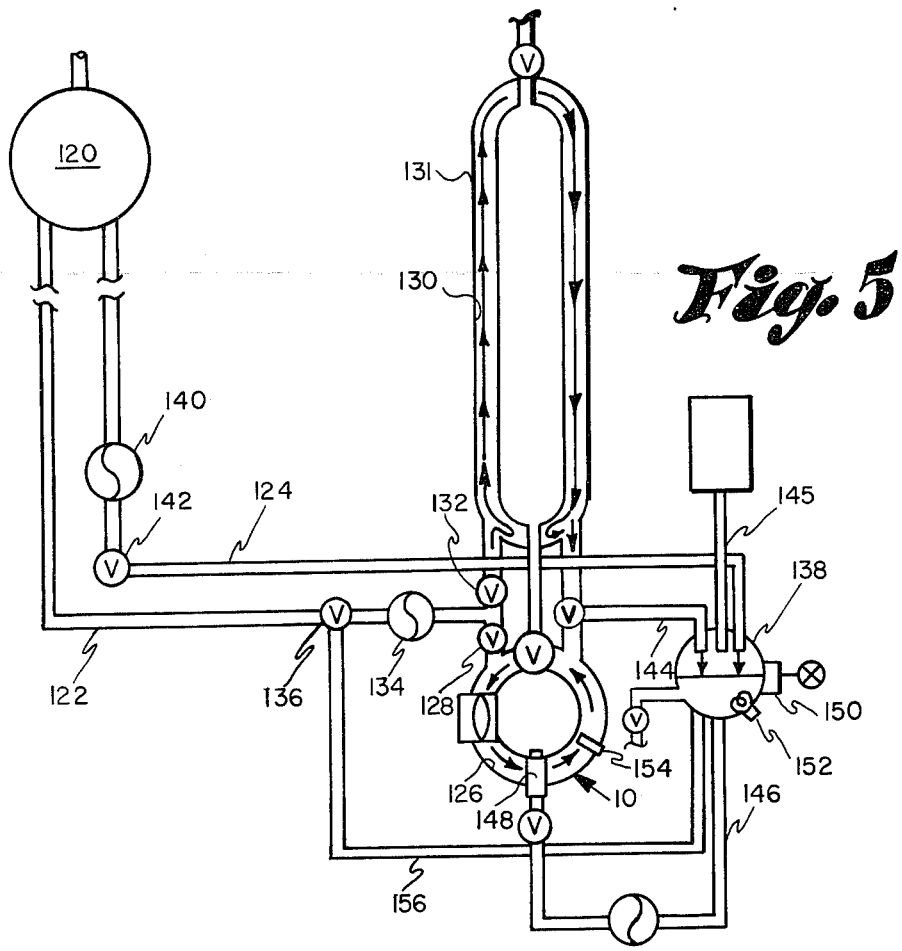
FIG. 5 illustrates schematically a coolant-preheater loop suitable for operation in the invented method.

Depicted in FIG. 5 is a system by which a portion of the incoming process water may be diverted and circulated though the cooling jacket surrounding the reaction chamber and another portion circulated through the cooling jacket of the separation chamber, thus preheating both portions of the incoming process water. Referring now to FIG. 5, demineralized water storage tank 120 feeds water lines 122 and 124. Line 122 is connected to cooling jacket 126 of the reaction chamber through valve 128. Line 122 is also connected to the cooling jacket 130 of separation tank 131 through valve 132. Included in the circuit of water line 122 are a pump 134 and a bypass valve 136 which is connected directly to preheater mixing tank 138. Water line 124 is connected directly to preheater mixing tank 138 and is provided with a water pump 140 and a control valve 142 in the line. Also feeding mixing tank 138 are recycled cooling water through line 144 and recirculated condensate from other parts of the process through condensate return line 145. The mixing tank has an outlet line 146 at its lower portion which is connected to injector head 148 of the reaction chamber. A water level sensor 150 in the mixing tank controls the input of water to the mixing tank through valve 142. Thermocouple 152 monitors the water temperature in the mixing tank and thermocouple 154 monitors the coolant temperature being circulated in the cooling jacket of the reaction chamber. Between periods of operation, water from tank 138 is recirculated through line 156 and valve 136 into the cooling jackets to remove excess latent heat to prevent thermal destruction of the major components.

The water in the cooling jackets 126 and 130 absorbs surplus heat from the reaction and separation chambers which was not used by the dissociation reaction as well as heat that is rejected as energy of recombination when atoms of the dissociated bases recombine to form molecules of gases and water vapor. The preheated water is then circulated into the preheater mixing tank 138 where it becomes mixed with other incoming process water at ambient temperature, thus preheating all the water in the mixing tank to about the same temperature prior to its injection through injector head 148 into the reaction chamber. The coolant-preheater loop has several distinct advantages. First it removes excess heat build-up and rejected energy of recombination from the reaction chamber and separation tank, thus reducing the probability of catastrophic failure of these components. Second, it uses this otherwise lost energy (waste heat) productively to preheat incoming process water. Third, by preheating the incoming process water prior to injection into the reaction chamber, greater process efficiencies are achieved over other systems. Since the incoming water temperature does not have to be increased as much, less energy is required to increase the temperature of the water vapor reactant to the dissociation point. Because more energy is made available for the dissociation process by this method, a greater quantity of water vapor can be dissociated with a given amount of radiant energy, or a given amount of water vapor can be dissociated at a greater rate than in previously known systems.

Figure 6:
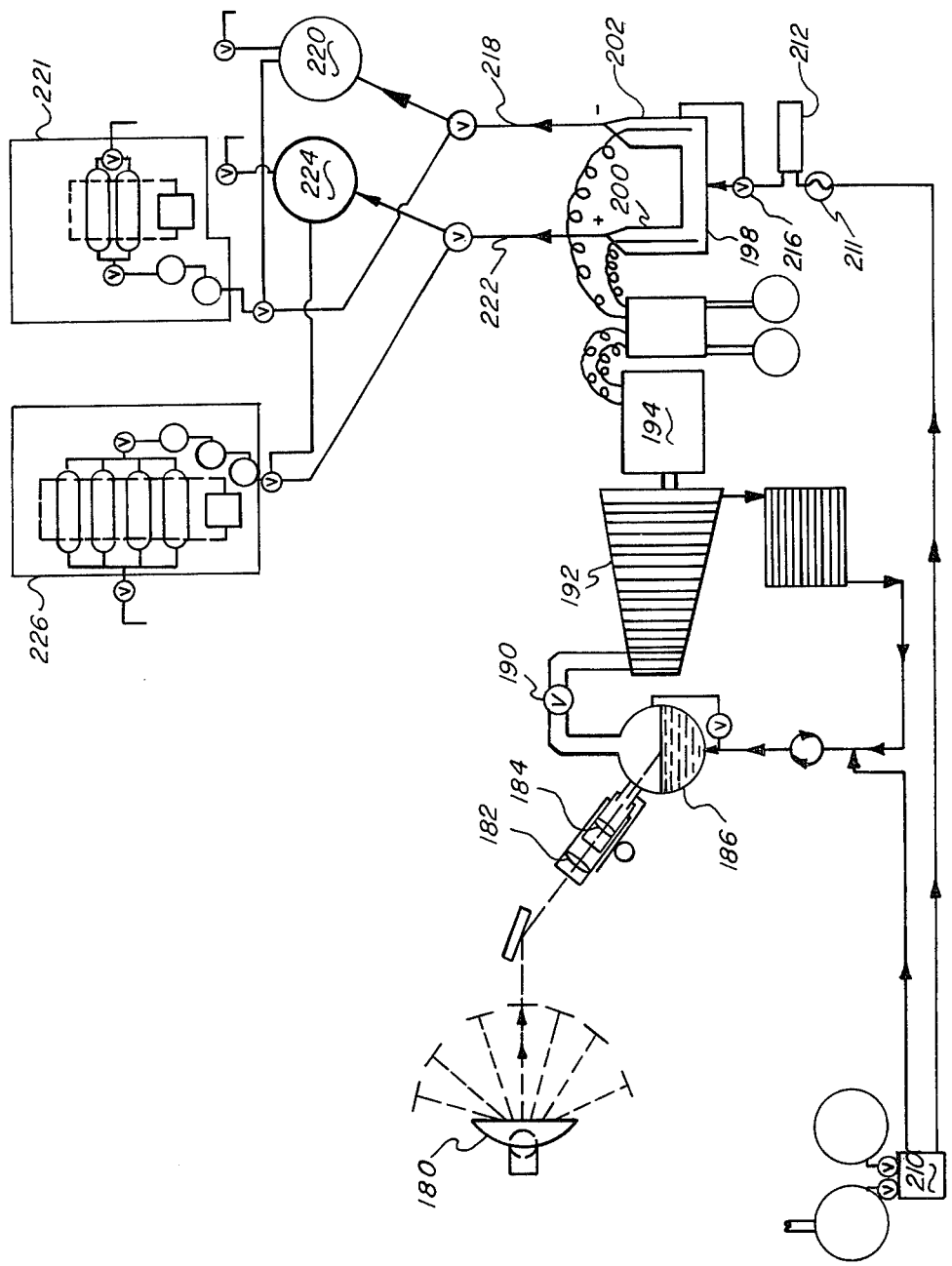
FIG. 6 illustrates schematically an alternative embodiment of this invention.

FIG. 6 shows an alternative embodiment of this process wherein solar energy is utilized to heat water in a boiler to a sufficient temperature to operate a steam turbine, which in turn runs a generator. The power generated operates an electrolytic cell in which hydrogen and oxygen are formed from water. Referring now to FIG. 6, a parabolic reflector 180 directs solar energy through a collector lens 182 and a focusing lens 184 into a water-containing boiler 186. The temperature in the boiler is sufficiently high that water entering it will flash to steam, which will then pass through turbine throttle valve 190 into steam turbine 192, driving associated generator 194.

The electrical output of generator 194 provides the electrical input to an electrolytic dissociator 198, having a anode 200 and a cathode 202. Fresh demineralized water from water supply 210 is fed through pump 211 to a mixing station 212 wherein the water is mixed with dilute solution of $H_2SO_4$ or other electrolyte to form an electrolyte solution. The electrolyte solution is introduced to electrolytic dissociator 198, such as a U-tube, the water level of which is kept constant by a level control 216. Elemental hydrogen is formed at the cathode 202 and is removed through line 218. It may be stored in the gaseous form in pressure vessel 220, or it may be refrigerated to liquid hydrogen in unit 221. Gaseous oxygen is removed through line 222 from the anode 220 and it likewise may be stored in gaseous form in tank 224, or it may be liquified in refrigeration unit 226. Alternatively, hydrogen may be combined as a metallic hydride and stored in this form for later use.

Figure 7:
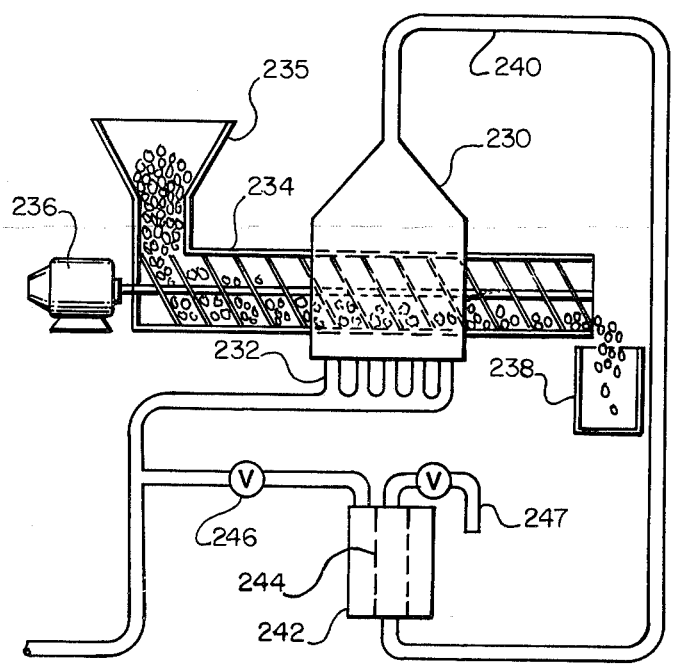
FIG. 7 is a schematic illustration of apparatus for forming a granular metal hydride.
Figure 8:
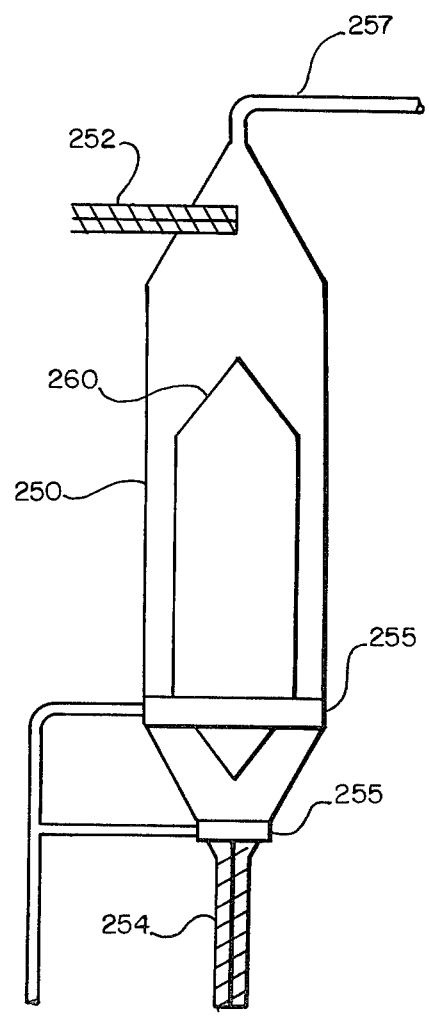
FIG. 8 is a schematic illustration of alternative apparatus for forming a granular metal hydride.

Two means for combining hydrogen as a metallic hydride are shown in FIGS. 7 and 8. In each instance, hydrogen is introduced to the bottom of a reactor through which a light metal or alloy in granular form is passed. Suitable light metals are those which will readily form hydride compounds which will release the hydrogen when subjected to a relatively small amount of heat. Vanadium is a preferable material but magnesium is also suitable as are the following metals and alloys which form interstitial hydrides:

Vanadium-columbium, lanthanum-copper-nickel, zirconium-nickel, titanium-nickel, iron-titanium, titanium-iron-chromium, palladium, titanium-iron-manganese, lanthanum-nickel, titanium-copper, titanium-manganese, magnesium-nickel, magnesium-copper, silver-palladium, platinum-palladium, columbium, copper-palladium, and manganese-nickel.

As shown in FIG. 7, a reactor 230 has a multiplicity of hydrogen inlet pipes 232 for introducing hydrogen through its bottom wall. A screw feeder 234 is fed by granular light metal from hopper 235 and driven by associated drive motor 236. The screw feeder is in an enclosed housing and at its end discharges metal hydride material into a storage bin 238. Hydrogen passes through the inlet pipes 232 into reactor 230 then through the granular metal in the reactor forming a metal hydride. Any unreacted hydrogen is withdrawn through pipe 240 and recycled through chamber 242 which has a hydrogen permeable membrane 244. Hydrogen passes through membrane 244 and is withdrawn through valve 246 and reintroduced to reactor 230. Any impurities remaining in chamber 242 from the removed hydrogen stream are removed through pipe 247.

An alternative embodiment as shown in FIG. 8 includes a vertically elongated reactor 250 having a feed mechanism 252 for introducing particulate material at its upper end and a discharge mechanism 254 at its lower end for removing reacted particulate material. Also near its lower end are one or more hydrogen injectors 255 for introducing gaseous hydrogen to the interior of the reactor. A hydrogen takeoff pipe 257 is provided for removing excess hydrogen and recirculating it to the hydrogen inlet. Each hydrogen injector 255 introduces hydrogen through orifices on its side and/or bottom to prevent clogging by particulate material in the reactor. Alternatively, the center of the reactor may be enclosed by a cone and cylinder member 260 which forces all of the particulates to fall through an annular tube. In this case the hydrogen will be injected through a hydrogen release collar, which is annular in form but would leave sufficient space for the gravitationally descending particulate material to pass as it descended toward the discharge mechanism 254. As another alternative, hydrogen may be injected into the reactor through downwardly angled orifices in the lower portion of the wall of the reactor.

The metal hydride powder product can be formed into ingots, billets, slabs, or briquets. When heated only a few hundred degrees F., the hydrogen is liberated from the metallic hydride and can then be utilized in other processes.

Figure 9:
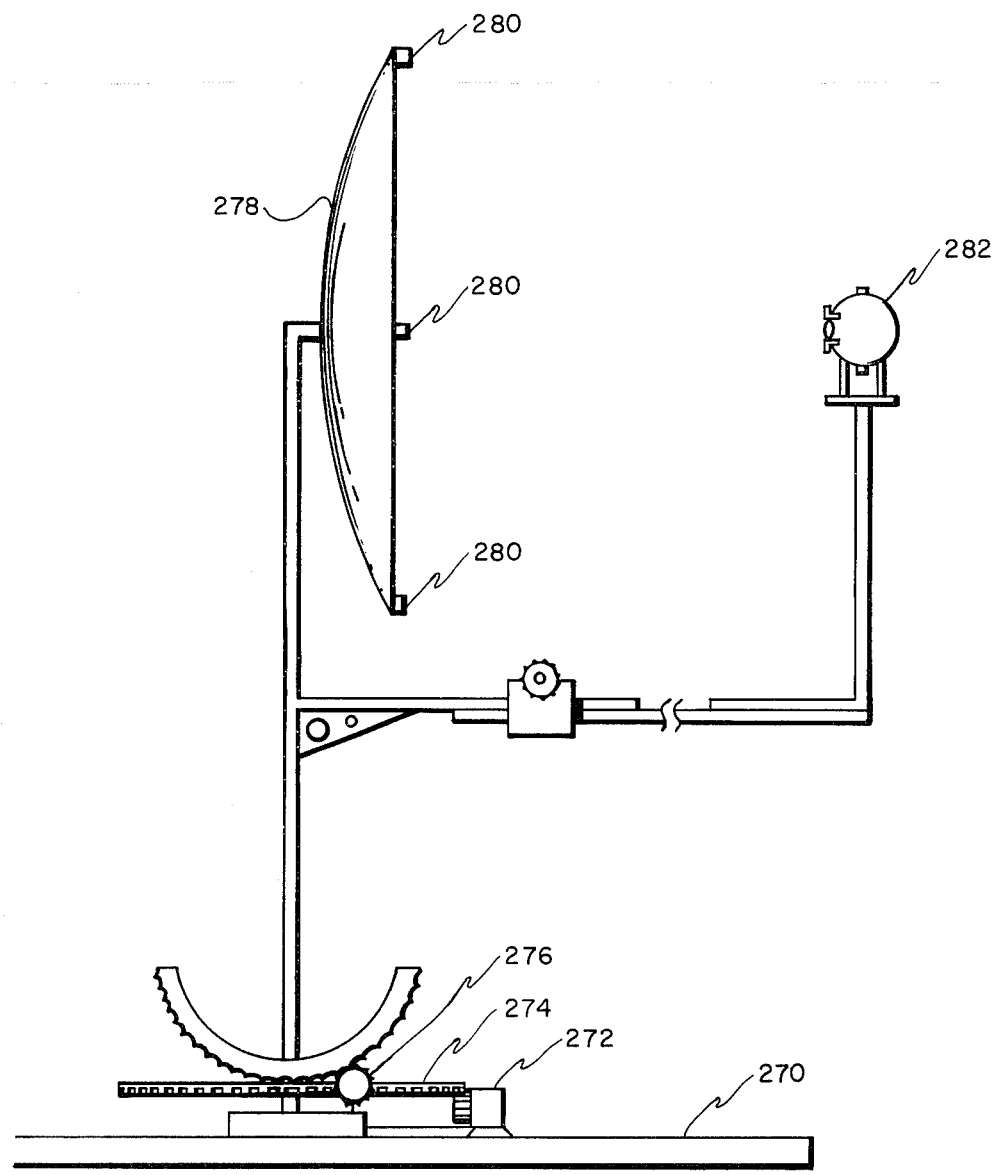
FIG. 9 is a side elevational view of a tracking reflector showing the relative location of a reaction chamber and associated drive mechanisms.

The tracking mechanism employed includes two systems. The first system, shown in FIG. 9, is an automatic timer controlled tracking mechanism programmed to follow the path of the sun across the sky. The timer controls a two-axis drive mechanism mounted on the base plate 270 of the reflector-dissociator mounting base and synchronizes the direction and rate of movement of the axis of the parabolic reflector with the center point of the sun's images as it trasverses its path through the sky each day.

Drive 272 engages horizontal rotation gear 274 for tracking the sun from dawn to dusk through an angle of about 180 degrees. If desired this drive could move the mechanism through 360 degrees merely by making gear 274 round. Tilting drive mechanism 276 comprises a ring and pinion gear or any other suitable drive means to tilt the parabolic reflector 278 through any desired angle up to approximatey 170 degrees.

This automatic timer controller tracking mechanism is similar to those devices used to control the movement of astronomers telescopes in tracking a given star in its nightly path through the sky and is programmed daily using known data regarding the sun's path through the sky for each day of the calendar year, from a given latitude and longitude. This programmable timer control unit can be located either on the base of the mounting mechanism or within the programmable control unit or both.

The second tracking system includes infra-red and ultra-violet sensors 280 mounted at the perimeter of each of the four quadrants of the parabolic reflector. The function of these sensors is to provide input signals to the programmable control logic unit to enable the computer logic to fine tune or trim the alignment of the reflector as it follows the path of the sun across the sky. This optimizes the amount of usable sunlight that reaches the reflector 278 and subsequently the reaction chamber 282. The reflector alignment is automatically balanced through servo-drive mechanisms until the signals generated by the ultra-violet and infra-red sensors 280 at each of the four points around the rim of reflector 278 are equalized and optimized at the level of greatest available solar energy input to the reflector.

The programmable logic for this infra-red tracking system has the capacity to override the control of the timer controlled tracking mechanism in circumstances where a wide divergence exists between the input signals of the two systems, e.g. when the sun's rays become temporarily obscured by a cloud, or the amount of available solar energy suddenly becomes greater at some point in the sky other than the center point of the sun's image, as when a hole appears in the clouds, or at some other point where the intensity of the background sunlight or "skylight" is temporarily greater than at the primary source. It is one of the functions of the infra-red and ultra-violet sensor system to detect this divergence and realign the reflector and heliostats accordingly. When the cloud cover condition returns to normal clear sky condition, the divergence in signals from the two systems will disappear and allow the alignment of the reflector to return to the control of the automatic timer drive mechanisms.

The infra-red and ultra-violet sensor systems also assist a programmable logic controller (PLC) in performing the vital function of controlling the rate of the dissociation reaction within the reaction chamber according to the available solar energy. When the level of available solar energy begins to decrease, infra-red and ultra-violet sensors and temperature sensors within the reaction chamber as well as those mounted on the parabolic reflector and heliostats sense this deviation and relay the information to the programmable logic control unit which in turn regulates servomechanisms that control the water injection valve and effluent pressure release valve in the reaction chamber. The water injection valve is partially closed and/or the pressure release valve opened thereby reducing the reactant flow rate through the reaction chamber. Accordingly, when the available sunlight drops below the minimum level required to sustain the dissociation reaction, the servo control system will automatically shut down the operation of the reaction chamber until sunlight conditions return to normal operating levels. Conversely, when the level of available solar energy begins to escalate, the sensory control logic automatically adjusts the flow rate through the reaction chamber accordingly, to optimize the dissociation rate.

The reaction chamber contains temperature and pressure sensors (not shown) which monitor conditions within the reaction and feed back this control data to the programmable logic control unit.

It is the primary function of the PLC process control unit to control and coordinate the operation of the entire system in order to maintain "steady state" operating conditions, including temperature, pressure, and flow rate witin the reaction chamber under sometimes varying environmental conditions. This is accomplished by controlling the water injection rate, and the incoming solar energy level, through the various injection and release valves, cooling-preheater system valves, and also by adjusting the sunlight tracking, collecting, and focusing mechanisms. In order to control and optimize the reaction rate and flow rate, and to maintain steady state operating temperature and pressure within the reaction chamber, the programmable logic process control unit relies on sensor input data from the various temperature, pressure, flow rate, infra-red, ultra-violet, hydrogen and oxygen sensors, as well as pre-programmed operating data on temperature and pressure control limits, solar tracking data, hydrogen and oxygen product levels, and required solar energy levels. The programmable process control logic unit is therefore the command control unit for all of the various sensor and servo systems that control the operation of the dissociating mechanism.

The heliostat field is also controllable about multiple axes, preferably about a horizontal and a vertical axis. The movements of the heliostats are controlled and coordinated by the programmable logic control unit to track, collect and reflect the rays of the sun onto the parabolic reflector.

Numerous alternative deployment arrangements have been conceived and are illustrated in FIGS. 10 through 18, but despite the deployment arrangement utilized, the basic function of the heliostat field always remains the same: that is, to track, collect, reflect, and focus additional available solar energy onto the parabolic reflector. The alignment of the heliostats can also be automatically adjusted by the programmable logic control unit to vary the intensity of the solar energy input to the parabolic reflector in order to regulate energy input to the reaction chamber.

Figure 10:
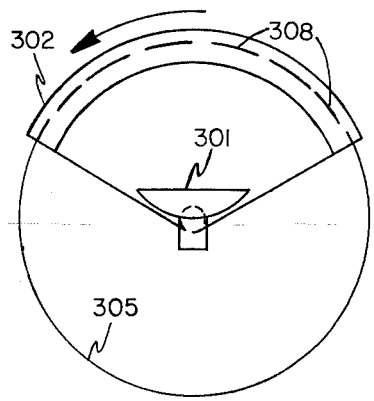
FIGS. 10 through 17 are plan views of various arrangements of solar energy collectors wherein heliostats are arranged about a parabolic reflector.
Figure 11:
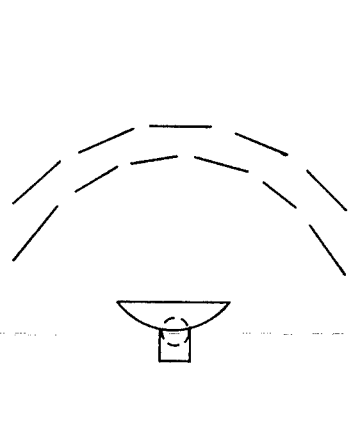
Figure 12:
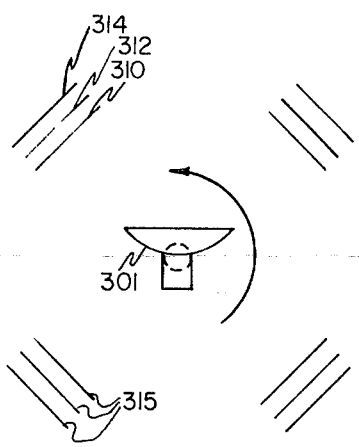
Figure 13:
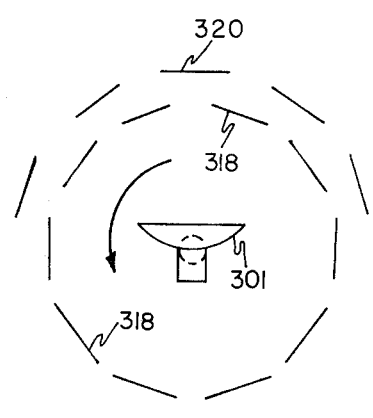
Figure 14:
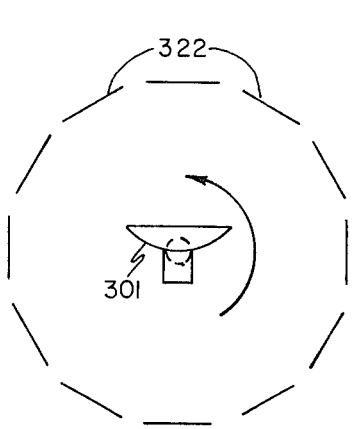
Figure 15:
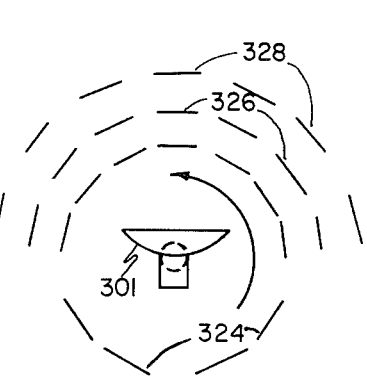
Figure 16:
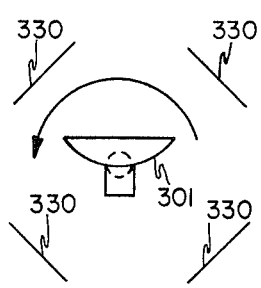
Figure 17:
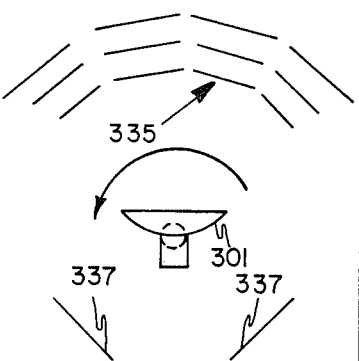

FIG. 10 shows a parabolic reflector 301 connected to a track mounted heliostat base 302 which rides on circular track 305. Any desired number of heliostats 308 are mounted on base 302 for reflecting the sun's rays against the parabolic reflector 301. Although the alternative embodiments shown in FIGS. 11 through 18 are not indicated as track mounted, such a track mounting may be employed in each embodiment if desired. FIG. 11 shows dual rows of staggered heliostats which may be staggered both horizontally and vertically. In FIG. 12, heliostat 310 is at a low elevation, heliostat 312 is slightly higher and heliostat 314 is highest. All three heliostats reflects solar rays into parabolic reflector 301. The back reflectors 315 pick up rays that miss the parabolic reflector 301 or they can be employed to collect solar rays at different times of day. FIG. 13 shows parabolic reflector 301 completely surrounded by heliostats 318 which are backed at least partially by a second row of staggered heliostats 320. FIG. 14 shows a rotational parabolic reflector 301 surrounded by heliostats 322. The parabolic reflector 301 of FIG. 15 is surrounded by heliostats 324 which are in part backed by a row of elevated heliostats 326 and a second row of elevated heliostats 328 all of which are symetrically arranged. The parabolic reflector of FIG. 16 is associated with only the basic four quadrant heliostats 330. FIG. 17 shows a heliostat arrangement whereby symetrically arranged rows of heliostats 335 face parabolic reflector 301 which is backed by heliostats 337.

Figure 18:
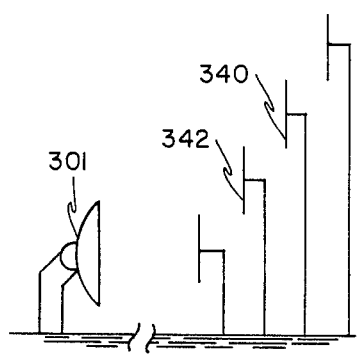
FIG. 18 is a side elevational view of a heliostat arrangement for directing solar energy into a parabolic reflector.

FIG. 18 is a side elevational view of a heliostat arrangement in which each succeeding row of heliostats such as row 340 is at a higher elevation than the preceeding row 342. There is no limit to the number of rows of heliostats that can be employed. The heliostats must be inclined at a proper angle to reflect the solar rays accurately into reflector 301.

The transfer of concentrated solar energy directly to the water vapor reactant within the reaction chamber is accomplished by passing the incoming light energy through a special lens, mounted in a passage in the wall of the reaction chamber, which finally focuses the light energy into the high energy concentration and temperature required for dissociation of water molecules at a central point within the reaction chamber.

The lens employed for the above transfer and final focusing must possess certain special properties of both material and design in order to maximize the efficiency of the transfer and concentration of the usable light energy into the reaction chamber.

First, the lens must be constructed of a material with the lowest possible absorption coefficient, and conversely the highest possible transfer efficiency, of the natural light spectrum, particularly the ultra-violet and infra-red wave lengths. It has been determined that an inorganic lens material, such as quartz or fluorspar (calcium fluoride), has the best transmission coefficients for ultra-violet and natural light wave lengths. Glass is unsuitable as it is opaque to nearly all of the ultra-violet and some of the infra-red wavelengths.

Second, the lens must be sufficiently thin to minimize energy transmission loss by absorption and diffusion within the lens material, with the resulting heat build-up that occurs thereby. Although a regular double convex quartz lens can be employed, a quartz lens of Fresnel type design will have a minimum lens thickness because of its flat plate cross section and still will achieve equivalent refraction and focusing parameters.

Third, the lens material must have sufficient strength and heat resistant properties to withstand the high temperatures and pressures that will occur within the reaction chamber. Again, an inorganic lens material, such as quartz, best fulfills the requirements.

Fourth, the lens must have a sufficiently short focal length to produce a point focus within the center of the reaction chamber from a distance at or shortly beyond the inner wall of the reaction chamber. This is a readily achievable parameter with either a Fresnel lens or any conventional convex lens with a converging configuration capable of producing a short focal length such as a double convex or plano-convex lens.

An important feature of this invention is that the beam of light that has been collected by the parabolic reflector and redirected through the focusing lens into the reaction chamber is intentionally somewhat defocused at its point of contact with the focusing lens, which then refracts the light toward a focal point within the center of the reaction chamber. This minimizes energy loss due to premature concentration or focusing, increases the level of energy concentrated at the focal point, and minimizes the outer surface temperature concentration on the focusing lens, thus reducing the probability of catastrophic lens failure from heat concentration and build up. This intentional defocusing of the incoming light beam at its interface with the focusing lens is achieved by adjusting the distance between the center point of the parabolic reflector and the center point of the focusing lens to a distance less than the natural focal length of the parabolic reflector. In practice, this adjustment is made by a remote control drive mechanism which lengthens or shortens the support member connecting the parabolic reflector assembly and the reaction chamber assembly. Fine adjustments of the focusing tube may be made as required.

By focusing the light rays at a point within the reaction chamber, there is less likelihood of failure of the construction materials of the reactor vessel itself, than if the rays were allowed to focus at or near a chamber wall.

Figure 19:
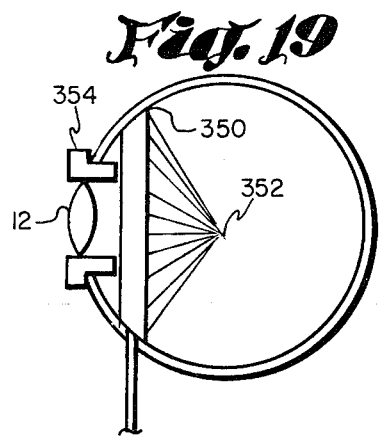
FIGS. 19 through 22 are cut-away side views of a reaction chamber with spray ring injector heads situated therein.
Figure 20:
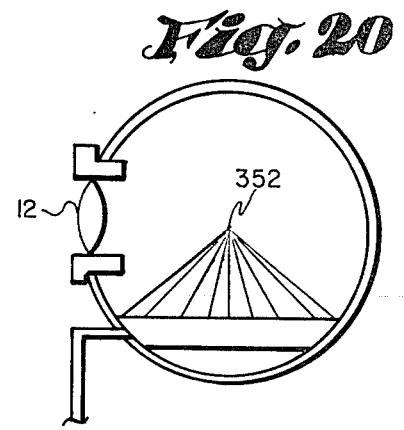
Figure 21:
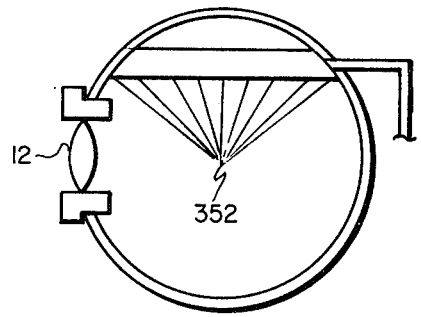
Figure 23:
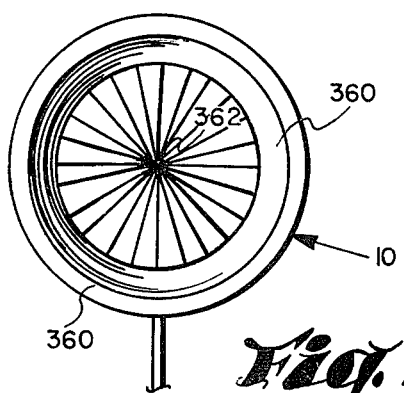
FIG. 23 is a sectional view of the reaction chamber and spray ring taken along line A—A of FIG. 22.

As an alternative to the spray head 30 of FIG. 1, a spray ring may be utilized as shown in FIGS. 19 through 23. This spray ring 350 has a multiplicity of spray jets directed toward the focal point 352 of lens 12. The spray ring can be located to surround lens sleeve 354 as shown in FIG. 19 or it can be situated in the bottom of the reactor as shown in FIG. 20 or in the top of the reactor as shown in FIG. 21 or in any other desired location. By locating the spray ring out of the direct rays of light, it will have a longer useful life. The spray ring 360 of FIG. 22 fits the internal circumference in the center of the spherical configuration of reactor 10. In this case, the spray jets are directed inwardly toward the focal point 362 of lens 12 as shown in FIG. 23.

Figure 22:
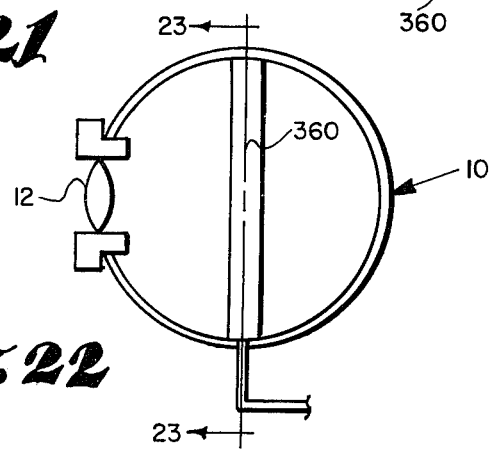
Figure 24:
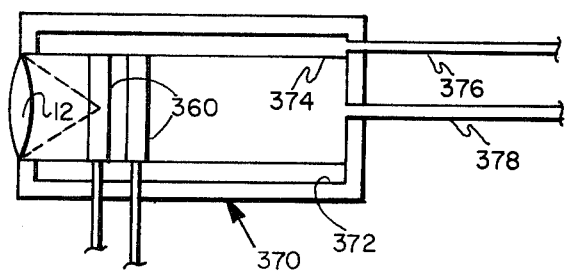
FIG. 24 is a schematic cut-away view of a tubular reaction chamber utilizing spray ring injectors.
Figure 25:
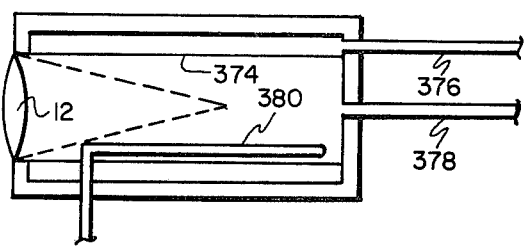
FIG. 25 is a tubular reaction chamber similar to that of FIG. 24 utilizing an alternative spray injector spray apparatus.

As an alternative to the spherical reactor of FIG. 22, a tubular reactor can be employed as shown in FIG. 24 or 25. Tubular reactor 370 has a water cooled jacket 372 and a focal lens 12. Inside the reactor 370 are one or more spray rings 360 within a hydrogen permeable membrane 374. Hydrogen is removed via line 376 and oxygen and other impurities are removed via line 378. Another alternative spray apparatus is depicted in FIG. 25 wherein an elongated spray pipe 380 is situated within the hydrogen permeable membrane 374 and directs spray jets into the region of the point of focus of lens 12.

It can readily be seen from the foregoing that this invention provides a means for obtaining elemental hydrogen in gaseous or liquid form or as a solid compound for use in other processes at a very low cost by employing solar energy as well as providing a means for obtaining elemental oxygen as a byproduct of the process.

While the preferred embodiments of the invention have been shown and described, it will be understood that they are merely illustrative and that changes may be made without departing from the scope of the invention as claimed.

What is claimed is:

1. A process for generating hydrogen and oxygen, comprising
   (a) injecting water into a reaction chamber,
   (b) collecting rays of the sun and reflecting said rays into said chamber,
   (c) concentrating said rays at a point spaced from and within the walls of said chamber to raise the temperature therein to the dissociation temperature of water,
   (d) dissociating said water into a hydrogen component and an oxygen component, and
   (e) separating the dissociated hydrogen from the oxygen.

2. A process according to claim 1 wherein said water is injected into said reaction chamber as a spray.

3. A process according to claim 1 further comprising removing substantially all impurities from said water prior to injection into said reaction chamber.

4. A process according to claim 3 wherein said water is substantially chlorine-free.

5. A process according to claim 1 wherein the temperature of said reaction chamber is maintained at least about 4500° F.

6. A process according to claim 1 wherein dissociation is accomplished at least partly by wave form irradiation.

7. A process according to claim 1 wherein both the infra-red wave lengths and the near ultra-violet wave lengths of the light spectrum are concentrated within said reaction chamber.

8. A process according to claim 1 further comprising separating dissociated hydrogen from oxygen by diffusion of hydrogen through a hydrogen-permeable membrane.

9. A process according to claim 1 wherein said dissociated hydrogen and oxygen is removed from said chamber as a gas mixture at high temperature prior to separating the gases.

10. A process according to claim 1 further comprising separating dissociated oxygen from hydrogen by diffusion of oxygen through an oxygen-permeable membrane.

11. A process according to claim 9 further comprising separating said hydrogen from said oxygen by compressing the dissociated gas mixture to the liquid state, followed by reverse distillation and collection of hydrogen and oxygen as cryogenic liquids.

12. A process according to claim 9 wherein separation of said gases is accomplished by gravity separation.

13. A process according to claim 1 furher comprising preheating said water prior to injecting it into said reaction chamber, whereby waste heat and rejected energy of recombination is utilized.

14. A process according to claim 1 wherein said rays are focused at a point within said chamber, said point being spaced from any structural element.

15. A process according to claim 14 wherein said point is substantially central in said chamber.

16. A process according to claim 1 characterized by defocusing said rays on a focusing lens in the wall of said chamber and focusing said rays at a point within said chamber and spaced from said wall.

17. Apparatus for generating hydrogen and oxygen from water, comprising:
(a) a refractory-lined, high temperature reaction chamber;
(b) a solar collector for collecting the sun's rays;
(c) means including a focusing lens for directing said rays through said lens into said chamber and concentrating said rays at a point therein;
(d) means for injecting water into said chamber;
(e) means for removing gases from said chamber;
(f) gas separating means; and
(g) means communicating with said gas removal means for feeding said gas to said separating means.

18. Apparatus according to claim 17 wherein said chamber includes a wall having a water-cooling jacket therein, and said focusing lens is positioned in the chamber wall.

19. Apparatus according to claim 18 wherein said lens is seated in a water-cooled lens sleeve.

20. Apparatus according to claim 18 wherein said chamber has a generally cylindrical configuration with said lens in the end wall of said chamber.

21. Apparatus accordng to claim 18 further comprising means for preheating water provided to said injecting means.

22. Apparatus according to claim 21 wherein a source of demineralized water is connected to said water-cooling jacket and said jacket communicateswith said injecting means.

23. Apparatus according to claim 18 wherein said solar collector is a multiplicity of heliostats positioned to direct solar rays into a reflector positioned to conduct the collected rays through said lens.

24. Apparatus according to claim 23 wherein said heliostats are mounted on a circular track about said reflector and are movable on said track.

25. Apparatus according to claim 23 wherein at least one heliostat is mounted in each quadrant about said reflector.

26. Apparatus according to claim 23 wherein said heliostats are mounted in successive rows, each row more distant from said reflector at a higher elevation than the previous row.

27. Apparatus according to claim 17 wherein said chamber has a generally spherical configuration.

28. Apparatus according to claim 17 wherein said gas separating means comprises a tank having a gas mixture inlet, a hydrogen permeable membrane dividing said tank into a first compartment containing said inlet and an oxygen outlet, and a second compartment containing a hydrogen outlet.

29. Apparatus according to claim 28 wherein said membrane is tubular in configuration.

30. Apparatus according to claim 17 wherein said chamber is lined with a reflective high temperature refractory.

31. A high temperature reaction chamer for dissociating water into hydrogen and oxygen, said chamber having a heat resistant focusing lens in its outer wall, a water cooling jacket in its outer wall, means for introducing water to the interior of said chamber, and means for withdrawing dissociated gases therefrom.

32. Apparatus according to claim 31 wherein said focusing lens is constructed of a material with a low absorption coefficient and a high transfer efficiency of the natural light spectrum including the ultraviolet and infra-red wave lengths.

33. Apparatus according to claim 32 wherein said lens material is selected from the group comprising quartz and flurospar.

34. Apparatus according to claim 31 wherein said water introducing means comprises at least one annular ring having a multiplicity of spray jets directed toward the center of the chamber.

35. Apparatus according to claim 31 wherein said chamber is a cylinder with said focusing lens in its end wall, and said water introducng means is an elongated pipe with said chamber parallel with the axis of said cylinder, and having a multiplicity of orifices for directing water jets toward the axis of said cylinder.

36. Apparatus according to claim 31 wherein said chamber includes a permeable membrane therein for separating the dissociated gases and said chamber has separate hydrogen and oxygen removal means.

37. Apparatus according to claim 36 wherein said permeable membrane is tubular.

38. Apparatus according to claim 32, wherein said focusing lens is constructed of an inorganic material.

* * * * *